United States Patent Office 2,913,468
Patented Nov. 17, 1959

2,913,468

HYDROXY-, R-OXY-ALUMINUM ACYLATES AND CONDSENSATION PRODUCTS THEREOF

Jacobus Rinse, Bernardsville, N.J., assignor to J. W. Ayers & Co., Easton, Pa., a corporation of Delaware No Drawing. Application March 21, 1955
Serial No. 495,765

16 Claims. (Cl. 260—414)

This invention relates to hydroxy-, alkoxy aluminum acylates and hydroxy-, phenoxy-aluminum acylates hereinafter referred to as hydroxy-, R-oxy aluminum acylates, and contemplates particularly the production of hydroxy-, R-oxy-aluminum acylates from aluminum alcoholates and phenolates. The invention also includes condensation products of the above acylates obtained merely by heating.

An object of the present invention is to produce a new series of coupling agents having the desirable properties of active metal alcoholates and in particular of the alcoholates heretofore produced by the applicant and defined in certain of his prior co-pending applications hereinafter mentioned. Within this field, a general object may be described as an effort to provide a new group of modified alcoholates of controllable activity for use as coupling agents, gelling agents, thickening agents, waterproofing agents, drying agents and components of coatings and adhesives.

Another object is to provide new suspending and wetting agents for pigments for use in paints and other compositions.

The aluminum compounds of the invention may be defined basically as hydroxy-, R-oxy-aluminum acylates, wherein R is a hydrocarbon radical. The thermo-condensation products of these compounds are formed by heating them to a temperature at which the R-oxy radical is liberated as an alcohol or a phenol, and continuing the heating until the desired viscosity and other properties are obtained.

For the production of the hydroxy-, R-oxy-aluminum acylates from compounds described in the literature, aluminum alcoholates or phenolates are used as the starting material. An intimate liquid mixture of the starting aluminum compound is formed with a monocarboxylic acid in the mol ratio of approximately 1:1; the resulting mixture is heated to a temperature at which the reaction proceeds and the reaction is completed during heating by vaporizing off from the reaction mass about one mol of hydroxy hydrocarbon liberated by the reaction, the intermediate product formed being a di-R-oxy aluminum monoacylate. This monoacylate is converted to the hydroxy-, R-oxy-aluminum acylate by mixing the same with water in the molar ratio of approximately 1:1 and heating the resulting mixture to a temperature at which reaction occurs with the liberation of about one mol of hydroxy hydrocarbon.

The R-oxy-aluminum reactant preferably employed is isopropoxide, for it is readily available and can be easily changed to its liquid metastable modification. It melts at 118° C. and upon cooling, a liquid is obtained which remains for some time before it changes to a solid tetramer form. The liquid form used in the reaction has much greater reactivity, this quality being, in part, attributed to the fact that it is a monomer or a dimer or a trimer.

Other aluminum alkoxides may be employed so long as the hydroxy hydrocarbon formed from the alkoxide group and liberated during the reaction is sufficiently volatile to permit its vaporization and removal from the reaction mass below the temperature at which the reaction product formed decomposes. Other suitable alkoxides are the ethoxide, the normal-propoxide, the normal- and iso-butoxides and pentoxides, the phenoxides, cresoxides and, as well, other alkoxides of relatively low boiling alcohols and phenols. Alkoxides of lower molecular alcohols are preferred.

The acid reactant may be any monocarboxylic acid. The preferred class of acids are the unsaturated fatty acids and in particular oleic acid, but other saturated and unsaturated fatty acids from formic to stearic acid and higher acids may be used. Also other monocarboxylic acids may be employed whether of natural origin or artificially produced, whether of normal or branched chain. Cycloaliphatic acids such as the naphthenic acids and hexahydrobenzoic acid; aromatic acids such as benzoic acid; phenylacetic acid and others of the series, and also abietic and other rosin acids or acid mixtures may be employed.

For successful production of the di-R-oxy-aluminum acylate in substantially pure form it is required that the reactants be intimately mixed together in the reaction mass. This intimate mixture may be brought about by employing the aluminum alcoholate as a heat-liquefied mass or as a finely divided solid or in dissolved form in a solvent for either or both of the reactants. Suitable solvents are hexane and mineral spirits of other hydrocarbon. The preferred procedure involves adding the acid under intensive agitation to the alkoxide in liquid form preferably in solution in a solvent and preferably at an elevated temperature somewhat below that at which reaction will take place. Through this method of securing an intimate homogeneous mixture, the formation of undesirable by-products is maintained at a minimum.

Suitable raw materials and methods of producing the R-oxy-aluminum acylates are disclosed in applicant's co-pending applications Serial No. 439,473 filed June 25, 1954 and Serial No. 489,777 filed February 21, 1955, both now abandoned.

After the intimate mixture of the reactants is obtained, the temperature of the mass is increased until reaction occurs, the temperature required in any particular case being dependent upon the reactants. Although some reaction will occur through heating at normal pressure, the reaction is facilitated by vaporizing off the liberated hydroxy hydrocarbon as the reaction proceeds. For completing the reaction and to provide a substantially pure product, it is generally necessary to apply a vacuum to remove the last amount of the one mol of alcohol or other hydroxy hydrocarbon liberated by the reaction. A vacuum of from 25 to 75 cms. of mercury is generally satisfactory.

In general it is desirable to carry out the reaction in its initial stages at temperatures at or somewhat below 100° C. and as low as 80° C. as long as the hydroxy hydrocarbon formed distills off easily. For completion of the reaction under vacuum the temperature may be increased to any higher temperature so long as decomposition does not occur. In many instances temperatures of 150° C. and higher can be advantageously employed.

For producing the hydroxy-, R-oxy-aluminum acylate from the di-R-oxy-aluminum acylate, the latter compound is intimately mixed with water in the molar ratio of approximately 1:1 and heated to a temperature at which reaction occurs and which distills off the hydroxy hydrocarbon liberated, no vacuum being required. The intimate mixture with the water is preferably obtained by liquefying the di-R-oxy-aluminum acylate and mixing the same at a temperature below the boiling point of water with the water and with a solvent, the preferred solvent being some of the hydroxy hydrocarbon corresponding to the R-oxy radical in the compound being reacted.

To produce the condensation product of the hydroxy-, R-oxy-aluminum acylate formed, it is necessary only to heat it at an elevated temperature at which additional hydroxy hydrocarbon is liberated, as for example, above about 160° C. until a viscous oil is obtained having the desired properties, the condensation ordinarily taking not more than thirty minutes although longer heating periods may be required in some instances.

Example 1

Aluminum isopropoxide powder in a quantity of 204 gm. is dissolved in 200 gm. mineral spirits and mixed with 280 gm. of oleic acid during agitation while the temperature is raised to 60 to 70° C. When a completely homogeneous mass is obtained it is then slowly heated to 100° C. where isopropanol and mineral spirits begin to distill off. Vacuum is applied and the heating is continued until a temperature of 160° C. is reached and until one mol of the alcohol has been removed.

The liquid aluminum di-isopropoxy-oleate obtained is cooled to 90° C. whereupon water and isopropanol are added in the amounts of 18 and 50 gm. respectively to 422 gm. of the oleate, the isopropanol being added to facilitate dispersion. Thereupon the mixture is heated to 150° C. and maintained at this temperature until 110 gm. of isopropanol vaporizes off at atmospheric pressure. Hydroxy-, isopropoxy-aluminum oleate is thereby obtained.

To produce the thermo-condensation product, this oleate compound is heated for thirty minutes at 200° C. As a result, a viscous oil having excellent wetting and suspending properties for pigments is obtained.

In the foregoing example, any of the other aluminum alcoholates herein disclosed may be substituted in equivalent amounts. Likewise the oleic acid may be replaced by any of the other monocarboxylic acids herein disclosed as for example, the saturated and unsaturated acids of 10, 12, 14, 16, 18 and 20 carbon atoms.

Example 2

Aluminum isopropoxide powder in a quantity of 204 gm. is dissolved in 400 gm. of hexane. Thereupon 280 gm. of stearic acid heated to 70° C. is added during constant agitation. The mass is heated at 60°–70° C. until a completely homogeneous mass is obtained, and then it is slowly heated to 100° C. during which time isopropanol and hexane distill off. The removal of the last traces of isopropanol is facilitated by the application of a vacuum to the reaction mass. The reaction product obtained is composed of aluminum diisopropoxy monostearate in substantially pure form as a white, solid material. The yield is approximately 424 gm.

Monostearate obtained in the above manner, in a quantity of 424 gm., is melted and then cooled to about 90° C. and mixed with 18 gm. of water and 50 gm. of isopropanol. The homogeneous mixture thereby obtained is heated to 150° C. until about 110 gm. of isopropanol have been distilled off. By proceeding in this manner, hydroxy isopropoxy-aluminum stearate is obtained.

Example 3

Aluminum isopropoxide powder in a quantity of 204 gm. is melted in the presence of 94 gm. of phenol and as a result 60 gm. of isopropanol distill off. The reaction product obtained is thereupon dissolved in 200 gm. of mineral spirits whereupon 144 gm. of octoic acid is added during constant agitation. By further processing and reacting under the procedure described in Example 2, a product is obtained which is a white solid.

The propoxy-phenoxy-aluminum octoate obtained is reacted with water in the manner described in Example 1 and as a result hydroxy-phenoxy-aluminum octoate is obtained.

In the foregoing example, any of the other aluminum alcoholates herein disclosed may be substituted in like amounts. The octoic acid may be replaced by any of the other monocarboxylic acids herein disclosed as for example, the saturated and unsaturated acids of 2, 3, 4, 5, 6, 7, 8 and 9 carbon atoms.

Example 4

Cool liquid aluminum isopropylate in a quantity of 204 gm. is introduced into 122 gm. of powdered benzoic acid and stirred to form a homogeneous mass after which the mixture is heated to 150° C. at which time 60 gm. of isopropyl alcohol will have been vaporized off, thereby forming di-isopropoxy-aluminum benzoate.

The benzoate obtained is cooled and mixed in the liquid state with water in a mol ratio of 1:1 in the presence of some isopropyl alcohol to assist in obtaining a uniform mass, after which the mixture is again heated gradually to about 200° C.

When between one and two additional mols of the alcohol have been formed and vaporized off, an oily mass is obtained which is a condensation product of hydroxy-isopropoxy-aluminum benzoate.

It should be understood that the present invention is not limited to the specific examples hereinbefore given but that it extends to all equivalents which will occur to those skilled in the art upon consideration of the general teachings of the invention described herein and of the description of the invention defined by the claims appended hereto.

I claim:
1. New compounds, hydroxy-, R-oxy-aluminum carboxylates wherein R is a hydrocarbon radical the hydroxide of which is low boiling, and the mol ratio of the three substituents on the aluminum atom being approximately 1:1:1.

2. Hydroxy-, alkoxy-aluminum carboxylates, the carboxyl group of which contains from 2 to about 20 carbon atoms, and the mol ratio of the three substituents on the aluminum atom being approximately 1:1:1.

3. Hydroxy-, phenoxy-aluminum carboxylates, the mol ratio of the three substituents on the aluminum atom being approximately 1:1:1.

4. New compounds, hydroxy-, R-oxy-aluminum carboxylates, wherein R is a low molecular hydrocarbon radical and the carboxylate radical is a higher molecular radical and the mol ratio of the three substituents on the aluminum atom is approximately 1:1:1.

5. New compounds, hydroxy-, R-oxy-aluminum carboxylates, wherein R is a lower molecular aliphatic radical and the carboxylate radical is a higher molecular radical and the mol ratio of the three substituents on the aluminum atom is approximately 1:1:1.

6. New compounds, hydroxy-, R-oxy-aluminum carboxylates, wherein R is a hydrocarbon radical the hydroxide of which is vaporizable below the decomposition temperature of the corresponding compound herein claimed and the carboxylate radical is of a higher molecular unsaturated fatty acid and the mol ratio of the three substituents on the aluminum atom is approximately 1:1:1.

7. Hydroxy-, alkoxy-aluminum oleate the mol ratio of the three substituents on the aluminum atom being approximately 1:1:1.

8. Hydroxy-, lower molecular alkoxy-aluminum oleate the mol ratio of the three substituents on the aluminum atom being approximately 1:1:1.

9. Hydroxy-, isopropoxy-aluminum oleate the mol ratio of the three substituents on the aluminum atom being approximately 1:1:1.

10. Thermo-condensation products of hydroxy-, R-oxy aluminum carboxylates wherein R is a hydrocarbon radical the hydroxide of which is low boiling, and the mol ratio of the substituents on the aluminum atom is approximately 1:1:1.

11. Thermo-condensation products of hydroxy-, R-oxy aluminum carboxylates wherein R is a hydrocarbon radical the hydroxide of which is low boiling and the carboxylate radical is of a higher molecular unsaturated fatty acid radical and the mol ratio of the three substituents on the aluminum atom being approximately 1:1:1.

12. A process for producing hydroxy-, R-oxy-aluminum acylates from aluminum alcoholates and phenolates of the formula Al(OR)$_3$ wherein R is a hydrocarbon radical and the mol ratio of the three substituents on the aluminum atom being approximately 1:1:1 which comprises, forming an intimate liquid mixture of the aluminum compound with a monocarboxylic acid in the mol ratio of approximately 1:1, said monocarboxylic group being free of any functional groups which would interfere with the reactions hereinafter specified, heating the mixture to a temperature at which reaction proceeds, completing the reaction during heating by vaporizing off from the reaction mass about one mol of hydroxy hydrocarbon liberated by the reaction, thereby forming a di-R-oxy-aluminum monoacylate, adding water to said acylate in the liquid state in the molar ratio of approximately 1:1, intimately dispersing the water throughout the mass and heating and reacting the resulting mixture until about one mol of hydroxy hydrocarbon is liberated and vaporized off, whereby the hydroxy-, R-oxy-aluminum acylate is obtained.

13. The process of preparing hydroxy-, R-oxy-aluminum acylates wherein R is a lower molecular hydrocarbon which comprises, forming an intimate liquid mixture of a di-R-oxy-aluminum monocarboxylate with water in the molar ratio of approximately 1:1 by adding the water to the carboxylate and mixing the same until the water is intimately dispersed throughout the mass, said monocarboxylate group being free of any functional groups which would interfere with the reaction hereinafter specified, heating the resulting uniform mass to a temperature at which reaction occurs and continuing the heating until about one mol of hydroxy hydrocarbon is liberated and vaporized off, whereby the hydroxy-, R-oxy-acylate is obtained.

14. The process of preparing hydroxy-, R-oxy-aluminum acylates wherein R is a hydrocarbon radical the hydroxide of which is vaporizable below the decomposition temperature of the herein specified prepared compound which comprises, heating and liquefying a di-R-oxy-aluminum monocarboxylate, said monocarboxylate group being free of any functional groups which would interfere with the reaction hereinafter specified, cooling it to a temperature below the boiling point of water, adding to and intimately dispersing therethrough a quantity of water providing a molar ratio of approximately 1:1, said uniform dispersion serving to avoid any local areas of water in excess of said ratio, reacting the components in the admixture with the aid of heat, and increasing the temperature to a level above boiling at which hydroxy hydrocarbon is vaporized off, whereby the hydroxy-, R-oxy-aluminum acylate is formed.

15. A process for producing R-oxy-aluminum acylates wherein R is a hydrocarbon radical the hydroxide of which is vaporizable below the decomposition temperature of the herein specified prepared compound which comprises, heating and liquefying a di-R-oxy-aluminum monocarboxylate, said monocarboxylate group being free of any functional groups which would interfere with the reaction hereinafter specified, adding water thereto in a molar ratio of approximately 1:1 while the liquefied mass is at a temperature below the boiling point of water, adding also to the mass a hydroxy hydrocarbon solvent for the water, mixing the resulting mass thereby obtaining an intimate uniform mixture of the water dispersed throughout the carboxylate, heating the resulting uniform mass to a temperature at which reaction occurs and continuing the heating until about one mol of hydroxy hydrocarbon is liberated and vaporized off, whereby the hydroxy,- R-oxy-aluminum acylate is formed.

16. A process for producing alkoxy-aluminum carboxylates which comprises, heating and liquefying a di-alkoxy-aluminum monocarboxylate of an unsubstituted fatty acid having from 1 to 20 carbon atoms, adding water thereto in a molar ratio of approximately 1:1 while the liquefied mass is at a temperature below the boiling point of water, mixing the resulting mass, thereby obtaining an intimate uniform mixture of the water dispersed throughout the carboxylate, heating the resulting uniform mass to a temperature at which reaction occurs and continuing the heating until about one mol of alcohol is liberated and vaporized off, whereby an hydroxy-, alkoxy-aluminum carboxylate is formed.

References Cited in the file of this patent

UNITED STATES PATENTS

| | | |
|---|---|---|
| 2,618,536 | Hunn | Nov. 18, 1952 |
| 2,744,074 | Theobold | May 1, 1956 |
| 2,801,190 | Orthner et al. | July 30, 1957 |

FOREIGN PATENTS

| | | |
|---|---|---|
| 519,092 | Belgium | Apr. 30, 1953 |

OTHER REFERENCES

Hackh's Chemical Dictionary, The Blakiston Co., Phila., 1950.

The Van Nostrand Chemist's Dictionary, D. Van Nostrand Co. Inc., New York, 1953.